United States Patent [19]

Mito et al.

[11] 4,095,234

[45] June 13, 1978

[54] RECORDING APPARATUS FOR PROVIDING LUSTROUS PRINTING

[75] Inventors: Sanai Mito, Takarazuka; Shinji Kinpara; Yuji Sumitomo, both of Nara; Toshio Kobayashi, Osaka, all of Japan

[73] Assignee: Sharp Kabushiki Kaisha, Osaka, Japan

[21] Appl. No.: 813,329

[22] Filed: Jul. 5, 1977

[30] Foreign Application Priority Data

Jul. 8, 1976 Japan ................................ 51-81692

[51] Int. Cl.[2] ........................ G01D 15/18; B41M 5/00

[52] U.S. Cl. ...................................... 346/75; 101/471; 427/22

[58] Field of Search .................. 346/75; 101/467, 470, 101/471; 427/22, 56

[56] References Cited

U.S. PATENT DOCUMENTS

| | | | |
|---|---|---|---|
| 2,954,311 | 9/1960 | Vander Weel | 101/471 |
| 3,054,692 | 9/1962 | Newman et al. | 101/471 X |
| 3,148,617 | 9/1964 | Roshkind | 101/471 |
| 3,195,455 | 7/1965 | Newman | 101/471 |
| 3,281,259 | 10/1966 | Lux et al. | 427/56 |
| 3,648,608 | 3/1972 | Kaminstein | 101/471 X |
| 4,023,183 | 5/1977 | Takano et al. | 346/75 |

*Primary Examiner*—George H. Miller, Jr.
*Attorney, Agent, or Firm*—Birch, Stewart, Kolasch & Birch

[57] ABSTRACT

In a recording apparatus which prints desired symbols on a record receiving member with heat ray absorbing colored material, a heat ray source is provided for heating a printed surface. A roller assembly including a roller impregnated with luster is disposed in such a manner that the printed and heated surface is brought into contact with the impregnated roller. The printed symbols are glossed by the luster since the printed symbols are pre-heated.

7 Claims, 1 Drawing Figure

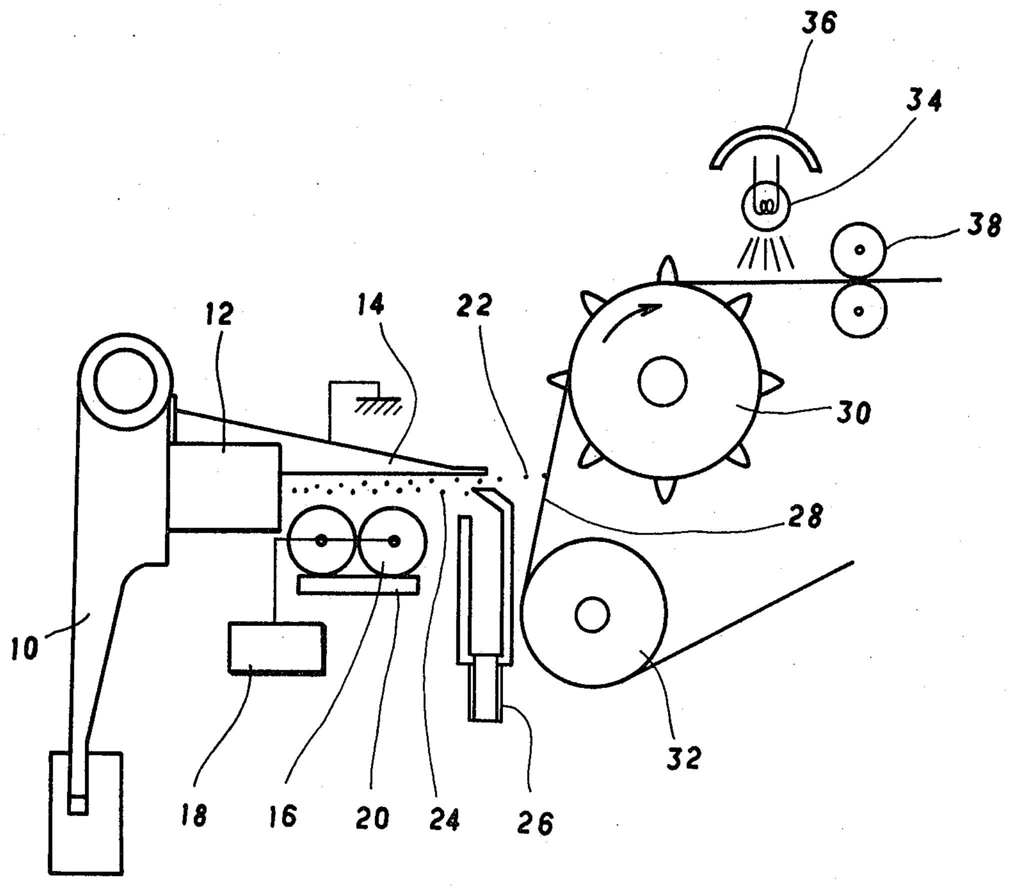
36
34
38
12
14
22
30
28
10
32
18
16
20
24
26

RECORDING APPARATUS FOR PROVIDING LUSTROUS PRINTING

BACKGROUND AND SUMMARY OF THE INVENTION

The present invention relates to a recording apparatus such as an ink jet system printer and, more particularly, to an assembly to provide lustrous printing in the recording apparatus.

In order to enhance the visibility or contrast of printed symbols, there has been proposed one method in an offset printing, wherein a lustrous surface is formed during pressure transcription operation. In this method, the entire surface of the printed sheet is glossed.

Generally, in various kinds of recording apparatus such as wire dot printers, thermal printers, electrostatic recording apparatus and ink jet system printers, it is desirable that the printed symbols are glossed without glossing the printed sheet in order to enhance the visibility or contrast.

Accordingly, an object of the present invention is to enhance the visibility or contrast of printed symbols in a recording apparatus.

Another object of the present invention is to provide lustrous printing in a recording apparatus.

Other objects and further scope of applicability of the present invention will become apparent form the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a heat ray source is provided for heating a record receiving material surface on which desired symbols have been printed with properly colored heat ray absorbing material such as ink, whereby the printed symbols are pre-heated. Thereafter, the record receiving material is driven to travel through a roller assembly which includes a roller impregnated with luster such as wax, said impregnated roller being brought into contact with the printed and pre-heated record receiving material surface. The luster contained within the impregnated roller is attached to the printed symbols since they are pre-heated by the heat ray source, whereby lustrous printing is formed.

In the present system, only the printed symbols are glossed without glossing the record receiving material surface where the symbols are not printed, because the symbols are printed with the heat ray absorbing material and, hence, the printed symbol portion bears a temperature higher than the non-printed section after passing under the heat ray source. Accordingly, the visibility of the printed symbols is remarkably enhanced.

BRIEF DESCRIPTION OF THE DRAWING

The present invention will become more fully understood from the detailed description given hereinbelow and the accompanying drawing which is given by way of illustration only, and thus is not limitative of the present invention and wherein, The single FIGURE of the drawing is a schematic representation of a system embodying the present invention.

DESCRIPTION OF THE PREFERRED EMBODIMENTS

The single FIGURE of the drawing shows an ink jet system printer embodying the present invention.

Generally, an ink jet system printer of the charge amplitude controlling type mainly comprises a carriage 10 driven to travel in a reciprocating fashion, upon which a printer head 12 and a slim deflection electrode 14 are mounted, and a record receiving paper 28. The printer head 12 includes nozzle unit accompanying an electro-mechanical vibrator and a charging electrode. The nozzle unit emits ink droplets 22 and 24 toward the record receiving paper 28 at a give frequency determined by the electro-mechanical vibrator. Respective ink droplets are charged to predetermined amplitudes by the charging electrode in accordance with print information.

The ink jet system printer of the charge amplitude controlling type further comprises rotary deflection electrodes 16 to which a constant, high voltage source 18 is connected so as to creat a constant, high voltage electric field between the rotary deflection electrodes 16 and the slim deflection electrode 14 which is grounded. A cleaner pad 20 is disposed in such a manner that the cleaner pad 20 is brought into contact with the rotary deflection electrodes 16, whereby the rotary deflection electrodes 16 are cleaned during the rotation thereof.

The ink droplets 22 charged with charging signals are deflected as they pass through the constant, high voltage electric field created between the slim deflection electrode 14 and the rotary deflection electrodes 16. The thus deflected ink droplets 22 are deposited on the record receiving paper 28 to print desired symbols. The deflection amounts of the respective ink droplets 22 are proportional to the charge amplitudes carried by the respective ink droplets 22.

The ink droplets 24 not charged with the charging signals, or, not contributing to the printing operation are directed to a beam gutter 26 for recirculation purposes. The record receiving paper 28 is driven by a sprocket wheel 30 and a feed roller 32 to travel in a direction shown by the arrow in synchronization with the printing operation.

An infrared ray source 34 is provided to heat the surface of the record receiving paper 28, on which the desired symbols have been printed. The printed symbols are exposed to the infrared rays after a few seconds after completion of the formation of the desired symbols. In the above-mentioned type of the ink jet system printer, the symbols are printed through the use of black colored ink on a white paper. Therefore, the portion bearing the printed symbols takes a temperature higher than the portion where symbols are not printed.

A roller assembly 38 is disposed in such a manner that the record receiving paper 28 carrying the pre-heated, printed symbols thereon is passed through the roller assembly 38. One of the rollers of the roller assembly 38 confronting the printed surface of the record receiving paper 28 is impregnated with luster such as wax. The wax contained within the impregnated roller is attached to the printed symbols because they are pre-heated by the infrared ray source 34, whereby lustrous printing is formed.

A reflector 36 is disposed above the infrared ray source 34 so as to reflect the infrared rays emitted from the infrared ray source 34 toward the record receiving paper 28. Moreover, the reflector 36 functions to protect the operator and the roller assembly 38 from the infrared rays.

The distance between the infrared ray source 34 and the roller assembly 38 is determined by taking account of temperature attenuation of the printed, pre-heated symbols and stable operation of the impregnated roller.

The above-mentioned combination of the infrared ray source 34 and the roller assembly 38 is very effective for the ink jet system printer, because the infrared ray source 34 stabilizes the printing. It is preferable to use ink of low desiccation characteristics in the ink jet system printer in order to prevent the blocking of the nozzle. The infrared ray source 34 functions to dry the printed symbols and, therefore, ink suited for preferred operation of the printer head 12 can be employed.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a recording apparatus which prints desired symbols on a record receiving member through the use of preferably colored heat ray absorbing material, the improvement comprising:

- a heat ray source for heating the record receiving member carrying the printed symbols thereon;
- a roller impregnated with luster; and
- means for depressing said roller to the record receiving member carrying the heated, printed symbols thereon.

2. The recording apparatus of claim 1, wherein the record receiving member is a white paper and the symbols are printed with black colored ink.

3. The recording apparatus of claim 1, wherein the record receiving member is driven to travel along a predetermined course, and the heat ray source is an infrared ray source positioned above the travelling record receiving member carrying the printed symbols thereon.

4. The recording apparatus of claim 1, wherein the record receiving member is driven to travel along a predetermined course, and said roller is positioned downstream from the heat ray source along the travelling record receiving member.

5. In an ink jet system printer which emits charged ink droplets from a nozzle toward a record receiving member, deflects said charged ink droplets and deposits said deflected ink droplets on the record receiving member to print desired symbols on said record receiving member, the improvement comprising:

- means for driving said record receiving member to travel along a predetermined course;
- a heat ray source for heating the travelling record receiving member carrying the printed symbols thereon; and
- a roller assembly through which the heated record receiving member carrying the printed symbols is driven to travel, said roller assembly including
  - a first roller confronting the printed surface of said travelling record receiving member,
  - said first roller being impregnated with luster, and
  - a counter roller for depressing said travelling record receiving member against said first roller.

6. The ink jet system printer of claim 5, wherein said heat ray source is an infrated ray source positioned above the travelling record receiving member carrying the printed symbols thereon.

7. The ink jet system printer of claim 5, wherein said first roller is impregnated with wax.

* * * * *